(12) United States Patent
Guy et al.

(10) Patent No.: US 12,540,091 B1
(45) Date of Patent: Feb. 3, 2026

(54) REDUCTION OF CYANURIC ACID IN A BODY OF RECREATIONAL WATER

(71) Applicant: King Technology, Inc., Minnetonka, MN (US)

(72) Inventors: David Guy, Maple Grove, MN (US); Lyle Enderson, Anoka, MN (US); Brett Libby, Edina, MN (US)

(73) Assignee: King Technology, Inc., Minnetonka, MN (US)

( * ) Notice: Subject to any disclaimer, the term of this patent is extended or adjusted under 35 U.S.C. 154(b) by 414 days.

(21) Appl. No.: 17/989,450

(22) Filed: Nov. 17, 2022

Related U.S. Application Data

(60) Provisional application No. 63/361,048, filed on Nov. 19, 2021.

(51) Int. Cl.
| | | |
|---|---|---|
| *C02F 1/50* | (2023.01) | |
| *C02F 1/00* | (2023.01) | |
| *C02F 1/72* | (2023.01) | |
| *C02F 1/76* | (2023.01) | |
| *C02F 3/34* | (2023.01) | |

(Continued)

(52) U.S. Cl.
CPC ............... *C02F 9/00* (2013.01); *C02F 1/008* (2013.01); *C02F 1/505* (2013.01); *C02F 1/722* (2013.01); *C02F 1/76* (2013.01); *C02F 3/342* (2013.01); *C02F 2101/38* (2013.01); *C02F 2103/42* (2013.01); *C02F 2303/04* (2013.01); *C02F 2303/185* (2013.01)

(58) Field of Classification Search
CPC .. C02F 9/00; C02F 1/008; C02F 1/505; C02F 1/722; C02F 1/76; C02F 3/342; C02F 2101/38; C02F 2103/42; C02F 2303/04; C02F 2303/185; C02F 1/50; C02F 2101/12; C02F 2101/42
See application file for complete search history.

(56) References Cited

U.S. PATENT DOCUMENTS

| | | | | |
|---|---|---|---|---|
| 8,591,748 B2 * | 11/2013 | Hill | ........................ | A01N 59/16 |
| | | | | 210/764 |
| 9,302,924 B1 * | 4/2016 | Showell | .................... | C12N 1/20 |

(Continued)

FOREIGN PATENT DOCUMENTS

| | | | | |
|---|---|---|---|---|
| AU | 2022204097 A1 * | 1/2023 | ................ | C02F 1/66 |
| CA | 3155387 A1 * | 5/2021 | ................ | C02F 1/70 |

(Continued)

OTHER PUBLICATIONS

English translation of Johann et al patent publication DE 102013208774, Nov. 13, 2014. (Year: 2014).*

(Continued)

*Primary Examiner* — Joseph W Drodge
(74) *Attorney, Agent, or Firm* — Fredrikson & Byron, P.A.

(57) ABSTRACT

A method of reducing the cyanuric acid in a body of recreational water by adding an algaecide such as metal ions to the body of recreational water before reducing the chlorine content in the body of recreational water followed by adding a cyanuric acid reducing agent to the body of recreational water to generate byproducts where the addition of chlorine can be used to remove the byproducts from the body of recreational water before adding additional chlorine to establish a safe level of chlorine in the body of recreational water.

26 Claims, 1 Drawing Sheet

(51) Int. Cl.
*C02F 9/00* (2023.01)
*C02F 101/38* (2006.01)
*C02F 103/42* (2006.01)

(56) References Cited

U.S. PATENT DOCUMENTS

| | | | | |
|---|---|---|---|---|
| 9,950,940 B1* | 4/2018 | Williamson | ............... | C02F 9/20 |
| 10,252,928 B2* | 4/2019 | Showell | ................... | C12N 1/20 |
| 11,306,010 B1* | 4/2022 | Guy | ..................... | C02F 1/722 |
| 11,401,184 B1* | 8/2022 | Guy | ..................... | C02F 1/76 |
| 2009/0223903 A1* | 9/2009 | Coffey | ................... | C02F 1/505 |
| | | | | 210/753 |
| 2010/0230365 A1* | 9/2010 | Hill | ...................... | C02F 1/505 |
| | | | | 210/744 |
| 2013/0134104 A1* | 5/2013 | Forstmeier | ............... | C02F 1/76 |
| | | | | 210/756 |
| 2013/0284649 A1* | 10/2013 | Tucker | ................... | C02F 1/505 |
| | | | | 210/139 |
| 2017/0334757 A1* | 11/2017 | Showell | ................... | C12N 1/20 |
| 2019/0119134 A1 | 4/2019 | Gorsuch et al. | | |
| 2021/0188672 A1* | 6/2021 | Shalon | ................... | E04H 4/1272 |

FOREIGN PATENT DOCUMENTS

| | | | | |
|---|---|---|---|---|
| CN | 106630254 A | * | 5/2017 | ............... C02F 9/00 |
| DE | 102013208774 A1 | * | 11/2014 | ............... C02F 1/763 |

OTHER PUBLICATIONS

English translation of Wang et al patent publication CN 106630254, May 10, 2017. (Year: 2017).*

Guo et al., "A procedure for removal of cyanuric acid in swimming pools using a cell-free thermostable cyanuric acid hydrolase", Journal of Industrial Microbiology and Biotechnology, 2022, 49, Published Nov. 12, 2021, pp. 14.

* cited by examiner

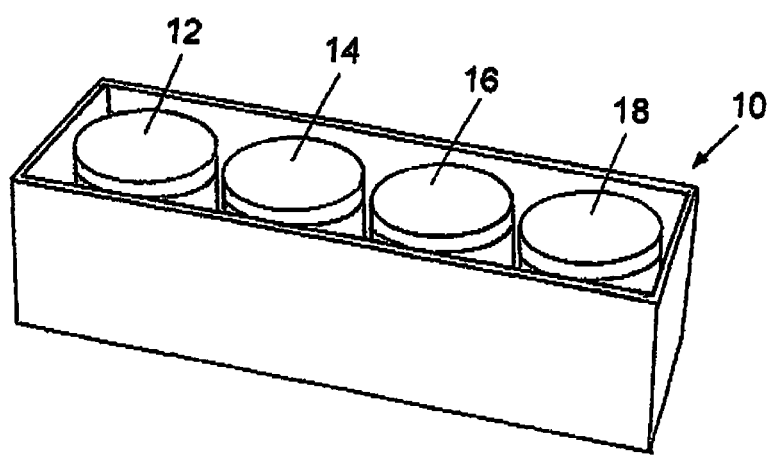

REDUCTION OF CYANURIC ACID IN A BODY OF RECREATIONAL WATER

CROSS REFERENCE TO RELATED APPLICATIONS

This application claims priority from Ser. No. 63/361,048 filed Nov. 19, 2021.

FIELD OF INVENTION

The present invention relates to reduction of cyanuric acid and, more specifically, reduction of cyanuric acid in a body of recreational water.

STATEMENT REGARDING FEDERALLY SPONSORED RESEARCH OR DEVELOPMENT

None

REFERENCE TO A MICROFICHE APPENDIX

None

BACKGROUND OF THE INVENTION

Typically, bodies of recreational water are treated with commercial chlorine sanitizers, which are sold under the trade names of dichlor or trichlor. The use of sanitizers such as dichlor or trichlor, which are effective in sanitizing a body of recreational water, have an unwanted consequence, namely, an increase in the level of cyanuric acid in the body of recreational water, which in turn has an adverse effect on the effectiveness of chlorine to sanitize the body of recreational water. To maintain the effectiveness of the chlorine one needs to reduce the amount of cyanuric acid in the body of recreational water. In one method a body of recreational water such as a hot tub or swimming pool the water containing cyanuric acid is drained from the pool and replaced with a fresh body of recreational water that contains no cyanuric acid. In another method a portion of the water in the hot tub or pool water, which contains the cyanuric acid, is drained from the pool and replaced with fresh water, which contains no cyanuric acid, thus reducing the concentration of cyanuric acid in the hot tub or pool water through a process of dilution.

Showell et al U.S. Pat. Nos. 9,302,924 and 10,252,928 discloses an alternate method of reducing the level of cyanuric acid in a body of recreational water without draining the body of recreational water. Showell et al adds a cyanuric acid reducing agent to the body of recreational water to reduce the cyanuric acid levels in the body of recreational water with the cyanuric acid reducing agent comprising a composition containing dextrose and a mixture of the bacterial species *bacillus* and *lactobacillus*.

Gorsuch et al US 2019/0119134 also discloses a composition and method for reducing cyanuric acid in recreational water systems using a combination of a "water-soluble or water dispersible carbon source" where the cyanuric acid reducing agent comprises "a mixture of non-pathogenic bacteria and a cyanuric acid degrading bacteria", which were identified by example as "*Enterobacter cloacae*" and "*Bacillus* subterraneous".

A difficulty in use of a cyanuric reducing agent is that the standard level of chlorine in the body of recreational water to maintain the water in a safe condition for human recreational use adversely affects the ability of the cyanuric reducing agent to remove the cyanuric acid from the body of recreational water. Consequently, the chlorine level in the body of recreational water should be reduced or eliminated so as not to hinder the action of the cyanuric acid reducing agent.

A further difficulty is that using a cyanuric reducing agent requires chlorine to oxidize the byproducts of the cyanuric acid reducing agent as well as additional chlorine to kill the bacteria or algae that grows during the period of cyanuric acid reduction. Also, after the cyanuric acid reduction has been completed additional chorine is required to reestablish the free chlorine level within the body of recreational water to bring the water to a safe condition for recreational use. As a result, large amounts of chlorine may be needed in the process of reducing the cyanuric acid and reestablishing the safe level of chlorine in the body of recreational water after the cyanuric acid has been reduced or eliminated from the body of recreational water.

SUMMARY OF THE INVENTION

A method to reduce cyanuric acid in a body of recreational water by adding a nonchlorine algaecide, for example a source of metal ions including metal ions of silver, copper, or zinc to the body of recreational water to inhibit the growth of algae and bacteria prior to reducing the concentration of chlorine in the body of recreational water to a level below a standard level of chlorine needed to prevent algae or bacteria growth in the body of recreational water. One then adds a cyanuric acid reducing agent to the body of recreational water. The cyanuric reducing agent, which may be either a cyanuric acid reducing bacteria or a cyanuric acid reducing enzyme, hydrolyzes the cyanuric acid in the body of recreational water. In the next step one adds sufficient chlorine to remove any byproducts of the cyanuric reducing agent as well as sufficient chlorine to establish a free chlorine level in the body of recreational water that is safe for recreational use.

The above method to reduce cyanuric acid in a body of recreational water uniquely allows one to estimate the total amount of chlorine to add to a body of recreational water to bring the body of recreational water back to a safe condition for human immersion. That is, by measuring the amount of cyanuric acid in the body of recreational water prior to adding the cyanuric reducing agent enables one to estimate a first amount of chlorine required to oxidize the cyanuric acid and the cyanuric acid byproducts. If the chlorine in the body of recreational water is eliminated prior to the addition of the cyanuric acid reducing agent one estimates a second amount of chlorine, which is based on the size of the body of recreational water, required to bring the chlorine content of the body of recreational water to a safe level for human immersion when there was no chlorine present in the body of recreational water. Thus, the above steps enable one to determine the total chlorine to add to the body of recreational water based on a known quantity of cyanuric acid and cyanuric acid byproducts that need to be removed from the body of recreational water.

BRIEF DESCRIPTION OF THE DRAWINGS

FIG. 1 shows a kit for reducing the cyanuric acid in a body of recreational water.

DESCRIPTION OF THE PREFERRED EMBODIMENT

While it is known that cyanuric acid reducing agents that hydrolyze cyanuric acid to biuret in bodies of recreational water, such as swimming pools, are known it is also known that the presence of chlorine in a swimming pool during the reduction of cyanuric acid with a cyanuric acid reducing agent hinders the effective removal of cyanuric acid from the swimming pool.

The process of cyanuric acid reduction in a body of recreational water such as an outdoor pool typically takes at least 24 hours or more, which allows algae and bacteria to grow unchecked in the pool if the chlorine in the pool has been removed or diminished during the process of the reduction of cyanuric acid. In addition, reestablishing chlorine in the pool to a level safe for recreational use requires adding chorine to the pool to kill the bacteria and algae that has grown during the period when there was little or no chlorine in the pool during the period when the cyanuric acid reducing agent breaks down cyanuric acid in the pool. Also, additional chlorine is required to bring the level of chlorine in the pool to a level that maintains the pool in a safe condition for recreational use.

In the present invention one hydrolyzes the cyanuric acid with a cyanuric acid reducing agent that produces biuret during the time the chlorine has been removed from the pool. At the same time, one limits or prevents algae growth in the pool by the addition of metal ions that can include a source of metal ions, which may include adding any or all of the metal ions such as copper, zinc and silver, into the pool prior to removing the chlorine from the pool and prior to adding the cyanuric acid reducing agent to the pool. The metal ions limit the growth of algae during the time the cyanuric acid reducing agent hydrolyzes the cyanuric acid thus reducing the amount of chlorine needed to reestablish a safe level of chlorine in the pool.

More specifically, the invention includes a method of reducing cyanuric acid in a body of chlorinated recreational water when an amount of cyanuric acid in the body of chlorinated recreational water reaches a level such that the amount of chorine in the body of chlorinated recreational water becomes ineffective in maintaining body of chlorinated recreational water in a sanitized condition for recreational use. In the method described herein one adds a source of metal ions to the body of chlorinated recreational water when the body of chlorinated recreational water contains a level of cyanuric acid that renders the chlorine in the body of recreational water ineffective to maintain the body of chlorinated recreational water in a sanitized condition for recreational use. In the first step one reduces or eliminates chlorine in the body of chlorinated recreational water, for example by adding sodium thiosulfate or sodium sulfite to the body of chlorinated recreational water. In the next step one adds a cyanuric acid reducing agent to the body of recreational water. One then allows the body of recreational water to rest while the cyanuric acid reducing agent hydrolyzes the cyanuric acid to biuret, which may take up to 24 hours. During the period when the chlorine has been removed from the body of normally chlorinated recreational water a source of metal ions, which have been added to the body of normally chlorinated recreational water, limit or prevent the growth of algae. After the cyanuric acid has been removed one adds sufficient chorine to the body of recreational water to remove byproducts of hydrolyzing of the cyanuric acid and to increase the chlorine content in the body of recreational water to a safe sanitized condition for recreational use.

FIG. 1 shows an example of a kit 10 for reducing the cyanuric acid in a body of recreational water with the kit containing a first container 14 with a nonchlorine algaecide, which for example may be copper, zinc, silver ions, a nonchlorine algaecide or a polyquat, a second container 16 with a chlorine neutralizing agent, which may be sodium thiosulfate or sodium sulfite a third container 18 with a cyanuric acid reducing agent and a fourth container 12 containing a liquid bleach (i.e. sodium hypochlorite) for oxidizing cyanuric acid metabolite in the body of recreational water. While the kit is shown with four containers to use in reducing the cyanuric acid in a body of recreational water the kit may contain more or less containers with contents suitable for reducing cyanuric acid in a body of recreational water.

The present invention of reducing the cyanuric acid in a body of recreational water may also comprise an inline dispenser cartridge that contains a first chamber supporting a nonchlorine algaecide such as but not limited to copper, zinc, silver ions, or a compound containing such therein, a second chamber supporting a neutralizer such as sodium sulfite, sodium thiosulfate or sodium bisulfite, and a third chamber supporting a cyanuric acid reducing agent such as cyanuric acid reducing bacteria or a cyanuric acid reducing enzyme therein. The dispensing of the materials in each of the chamber may be controlled with sized openings for optimal performance.

The algaecide in the inline dispenser cartridge may first be dispensed by a fluid stream running through an inline dispenser supporting the inline dispenser cartridge for a specific amount of time to effectively inhibit or control the growth of algae in body of recreational water.

The neutralizer supported in the inline dispenser cartridge is then dispensed into the body of recreational water by the fluid stream to reduce or eliminate the chlorine in the body of recreational water.

Once the neutralizer reduces the amount of chlorine in the body of recreational water to a safe level in the body of recreational water to support the cyanuric acid reducing agent, such as bacterial species *bacillus* and *lactobacillus*, the cyanuric acid reducing agent supported in the inline dispenser cartridge is then dispensed into the body of recreational water by the fluid stream to hydrolyze the cyanuric acid contained in the body of recreational water.

The dispensing of the materials in each of the chambers of an inline dispenser cartridge may alternatively comprise dispensing an algaecide and a neutralizer from the inline dispenser cartridge at the same time a fluid stream flows through the inline dispenser cartridge, thus allowing the inline dispenser cartridge to effectively inhibit or control the growth of algae in the body of recreational water while reducing the amount of chlorine in the body of recreational water.

Once the neutralizer reduces the amount of chlorine in the body of recreational water to a safe level in the body of recreational water to support the cyanuric acid reducing agent such as bacterial species *bacillus* and *lactobacillus*, the cyanuric acid reducing agent, which is supported in the inline dispenser cartridge can be dispensed into the body of recreational water by the fluid stream flowing through the inline dispenser cartridge to hydrolyze the cyanuric acid contained in the body of recreational water.

The above inline dispenser cartridge for reducing the cyanuric acid in a body of recreational water may be designed for a limited time use product, such as for example between 24 to 48 hours, which is a typical time required to reduce cyanuric acid in swimming pools of 5000 gallons. It is noted that the time required to reduce cyanuric acid in swimming pools may vary depending on various factors including but not limited to the size of the pool water pump, the water temperature of the body of recreational water, and weather conditions.

The present invention of reducing the cyanuric acid in a body of recreational water may further comprise a floating dispenser that contains a chamber supporting and dispensing a nonchlorine algaecide such as but not limited to copper, zinc, silver ions, or a compound containing such therein, a chamber supporting and dispensing a neutralizer such as sodium sulfite, sodium thiosulfate or sodium bisulfite, and a chamber supporting and dispensing a cyanuric acid reducing agent such as cyanuric acid reducing bacteria or a cyanuric acid reducing enzyme therein with the dispensing of the materials in each of the chamber may be controlled for optimal performance.

It is noted that the algaecide, the neutralizer, and the cyanuric acid reducing agent may be supported and dispensed in separate chambers within the floating dispenser or alternatively, the algaecide and the neutralizer may be supported in the same chamber while the cyanuric acid reducing agent is supported and dispensed in a separate chamber.

Test

To evaluate applicant's method for reducing cyanuric acid in a body of chlorinated recreational water seven outdoor swimming pools (i.e., test pools) each having a capacity of 5000 gallons were used to determine the effectiveness of reducing cyanuric acid when a source of metal ions is present in the test pools. The method includes adding a source of metal ions to the test pools, which contain cyanuric acid, to inhibit growth of algae before neutralizing the chlorine in the test pools and before adding a cyanuric acid reducing agent to the test pools. It is known that the cyanuric acid reducing agents breaks down cyanuric acid into biuret through a process of hydrolysis. Examples of cyanuric acid reducing agents are shown and described in Showell et al U.S. Pat. Nos. 9,302,924 and 10,252,928 which is hereby incorporated by reference.

The concentration of cyanuric acid in the test pools ranged from 80 to 180 ppm and the water temperature of the test pools during the time a cyanuric acid reducing agent was added to the test pools ranged from 69° F. to 72° F. The use of a cyanuric reducing agent can be found in article by Feng Guo, Joseph C. McAuliffe, Cristina Bongiorni, Jacob A. Latone, Mike J. Pepsin, Marina S. Chow, Raj S. Dhaliwal, Katherine M. Hoffmann, Bill T. Brazil, Meng H. Heng, Serina L. Robinson, Lawrence P. Wackett, Gregory M. Whited. (2022) that describe a procedure for removal of cyanuric acid in swimming pools using a cell-free thermostable cyanuric acid hydrolase. (Journal of Industrial Microbiology and Biotechnology, 2022, 49, kuab084)

In applicant's test the cyanuric acid was removed from the test pools with a cyanuric reducing agent comprising enzymes that hydrolyze cyanuric acid $C_3H_3N_3O_3$ to biuret $C_2H_5N_3O_2$, which is then removed by addition of chlorine to the test pools. The cyanuric reducing agent used to convert the cyanuric acid to biuret is an enzyme from Pseudolabrys bacteria, which is commercially available from IFF (International Flavors and Fragrances of New York, NY).

The test pools were allowed to rest for a day while the cyanuric acid reducing agent converts the cyanuric acid to biuret. During the rest period, where the cyanuric acid reducing agent converts the cyanuric acid to biuret, one can estimate the amount of chlorine required to bring the chlorine in the body of recreational water to a safe level for recreational use. Such an estimate is based on the amount of cyanuric acid initially present in the pool, the amount of cyanuric acid byproducts created during the hydrolyzing of the cyanuric acid Knowing the amount of cyanuric acid in the pool and the amount of byproducts of the cyanuric acid reducing agent one can determine the amount of chlorine needed to oxidize the byproducts of the cyanuric acid. Also knowing the size of the pool one can determine the amount of chlorine to bring the the chlorine level in the pool to a safe level for recreational use. The algaecides, in this example i.e., the metal ions, inhibit or prevent algae and bacterial growth during the period the cyanuric reducing agent rids the water of cyanuric acid. Consequently, no chlorine is required to eliminate algae of bacterial growth in the test pools during the rest period where the cyanuric acid reducing agent converts the cyanuric acid to biuret, which reduces the total amount of chlorine needed to reestablish a level safe level of chlorine in the test pools.

The concentration of silver in the test pools ranged from 1.4 to 6.0 ppb, the concentration of copper in the test pools ranged from 0.02 to 0.22 ppm and the concentration of zinc in the test pools ranged from 0.05 to 0.30 ppm. No adverse effect on the action of cyanuric acid reducing agent was found from the presence of the metal ions released into the test pools. The time for the cyanuric acid reducing agent to convert the cyanuric acid to biuret and to remove the biuret from the test pools ranged from 18-24 hours. It was found that the presence of metal ions in the test pools prevented algae growth for period of 3-8 days longer than a pool without metals ions, thus providing assurance that extra chlorine is required to compensate for algae or bacterial growth during the time the cyanuric acid reducing agent hydrolyzed the cyanuric acid.

As described herein the method of reducing cyanuric acid in a body of recreational water includes the steps of adding a nonchlorine algaecide, such as a source of metal ions, to the body of recreational water before reducing the amount of chlorine in the body of recreational water by adding a neutralizer such as sodium sulfite, sodium thiosulfate or sodium bisulfite to the body of recreational water before adding a cyanuric acid reducing agent to the body of recreational water. One then allows the body of recreational water, which contains the cyanuric acid reducing agent, to rest as the cyanuric acid reducing agent hydrolyzes the cyanuric acid. In the final step one can add an oxidizing agent such as chorine to the body of recreational water to remove any byproducts produced by the hydrolyzing of the cyanuric acid and to bring the body of recreational water to a sanitized condition safe for human immersion. Other nonchlorine algaecides include quaternary algaecides or polyquats.

In applicants' method a nonchlorine algaecide was added to the body of recreational water before reducing the amount of chlorine in the body of recreational water and before adding a cyanuric acid reducing agent to the body of recreational water. Next, the body of recreational water containing the cyanuric acid reducing agent is allowed to rest as the cyanuric acid reducing agent hydrolyzes the cyanuric acid.

After hydrolyzing the cyanuric acid, one may add sufficient chorine to the body of recreational water to remove any byproducts produced by hydrolyzing of the cyanuric acid.

We claim:

1. A method of reducing cyanuric acid in a body of recreational water containing an amount of chlorine effective for maintaining the body of recreational water in a sanitized condition for human use, comprising the steps of:

adding a source of metal ions to the body of recreational water to inhibit growth of algae in the body of recreational water and in response to an amount of cyanuric acid in the body of recreational water being high enough to render the amount of chlorine in the body of recreational water ineffective for maintaining the body of recreational water in the sanitized condition for human use, wherein the source of metal ions comprises a source of silver ions;

adding a chlorine neutralizing agent to the body of recreational water to substantially eliminate the amount of chlorine in the body of recreational water followed by adding a cyanuric acid reducing agent to the body of recreational water;

allowing the body of recreational water to rest while the cyanuric acid reducing agent hydrolyzes the cyanuric acid and forms biuret in the body of recreational water, thereby reducing the cyanuric acid in the body of recreational water; and adding sufficient chlorine to the body of recreational water to remove the biuret and to restore the amount of chlorine in the body of recreational water such that the body of recreational water is in the sanitized condition for human use.

2. The method of claim 1 wherein the adding a source of metal ions comprises adding sufficient metal ions to inhibit growth of algae and pathogenic bacteria in the body of recreational water while the cyanuric acid reducing agent hydrolyzes the cyanuric acid and forms biuret in the body of recreational water.

3. The method of claim 1 wherein the source of metal ions also comprises a source of copper ions.

4. The method of claim 3 wherein the source of metal ions also comprises a source of zinc ions.

5. The method of claim 4 wherein the body of recreational water is a swimming pool, and the adding a source of metal ions to the body of recreational water results in the body of recreational water including 1.4 to 6.0 ppb of silver, 0.02 to 0.22 ppb of copper, and 0.05 to 0.3 ppb of zinc.

6. The method of claim 1 wherein the body of recreational water comprises an outdoor body of recreational water.

7. The method of claim 1 wherein the body of recreational water comprises either a body of hot tub water or a body of spa water.

8. The method of claim 1 wherein the amount of cyanuric acid in the body of recreational water, upon initiating the adding a cyanuric acid reducing agent to the body of recreational water, is 30 ppm.

9. The method of claim 1 including measuring the amount of cyanuric acid in the body of recreational water prior to the adding a cyanuric acid reducing agent to the body of recreational water.

10. The method of claim 1 wherein the adding a cyanuric acid reducing agent comprises adding a cyanuric acid reducing bacteria to the body of recreational water.

11. The method of claim 1 wherein the adding a cyanuric acid reducing agent comprises adding a cyanuric acid reducing enzyme to the body of recreational water.

12. The method of claim 1 wherein the body of recreational water is in a swimming pool and wherein the cyanuric acid in the swimming pool is reduced without draining water from the swimming pool.

13. The method of claim 1 including measuring the amount of cyanuric acid in the body of recreational water, before the adding a cyanuric acid reducing agent to the body of recreational water, to obtain an estimate of an amount of the sufficient chlorine to be added to the body of recreational water to remove the biuret and to restore the amount of chlorine in the body of recreational water such that the body of recreational water is in the sanitized condition for human use.

14. The method of claim 1 wherein the adding a source of metal ions to the body of recreational water is done before the adding a chlorine neutralizing agent to the body of recreational water.

15. The method of claim 1 wherein the body of recreational water is a swimming pool, and the adding a source of metal ions to the body of recreational water is sufficient to prevent algae growth in the body of recreational water for at least 3 days.

16. The method of claim 15 wherein the adding a cyanuric acid reducing agent to the body of recreational water is performed while water temperature of the body of recreational water is in a range of about 69-72 degrees Fahrenheit and while a concentration of cyanuric acid in the body of recreational water is in a range of 80 to 180 ppm.

17. The method of claim 1 wherein the body of recreational water is a swimming pool, and the cyanuric acid reducing agent hydrolyzes the cyanuric acid and forms biuret in the body of recreational water over a time period of from 24 to 48 hours.

18. A kit for reducing cyanuric acid in a body of water containing chlorine, comprising;
a first container containing a source of metal ions therein, wherein the source of metal ions comprises a source of silver ions for inhibiting growth of algae in the body of water;
a second container containing a chlorine neutralizing agent for substantially eliminating chlorine in the body of water; and
a third container containing a cyanuric acid reducing agent for hydrolyzing the cyanuric acid and forming biuret in the body of water, thereby reducing an amount of cyanuric acid in the body of water.

19. The kit of claim 18 wherein the cyanuric acid reducing agent comprises a cyanuric acid hydrolase enzyme.

20. The kit of claim 19 including a fourth container containing a liquid bleach for oxidizing the biuret as a cyanuric acid metabolite in the body of water.

21. The kit of claim 18 wherein the source of metal ions also comprises a source of copper ions and a source of zinc ions.

22. The kit of claim 18 wherein the chlorine neutralizing agent comprises sodium thiosulfate, sodium sulfite, or sodium bisulfate.

23. The kit of claim 18 including a fourth container containing hydrogen peroxide for oxidizing the biuret as a cyanuric acid metabolite in the body of water.

24. The kit of claim 18 including a fourth container containing chlorine dioxide for oxidizing the biuret as a cyanuric acid metabolite in the body of water.

25. A method of reducing cyanuric acid in a body of recreational water containing chlorine, comprising the steps of:
first adding a non-chlorine algaecide to the body of recreational water to inhibit growth of algae in the body of recreational water, wherein the non-chlorine algaecide comprises a source of silver ions;
second adding a chlorine neutralizing agent to substantially eliminate chlorine in the body of recreational water;
third before adding a cyanuric acid reducing agent to the body of recreational water, which includes cyanuric acid;

fourth allowing the body of recreational water containing the cyanuric acid reducing agent to rest as the cyanuric acid reducing agent hydrolyzes the cyanuric acid, thereby reducing an amount of cyanuric acid in the body of recreational water and forming a cyanuric acid metabolite; and fifth adding chlorine to the body of recreational water to remove the cyanuric acid metabolite.

26. The method of claim 25 wherein the chlorine neutralizing agent comprises sodium thiosulfate, sodium bisulfite, or sodium sulfite.

\* \* \* \* \*